2 Sheets--Sheet 1.
B. J. TAYMAN.
Improvement in Carving-Machines.
No. 126,994. Patented May 21, 1872.
FIG. 1
FIG. 2
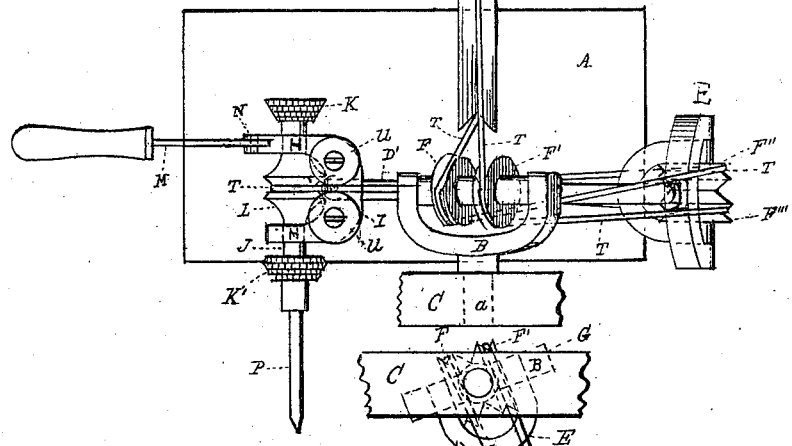
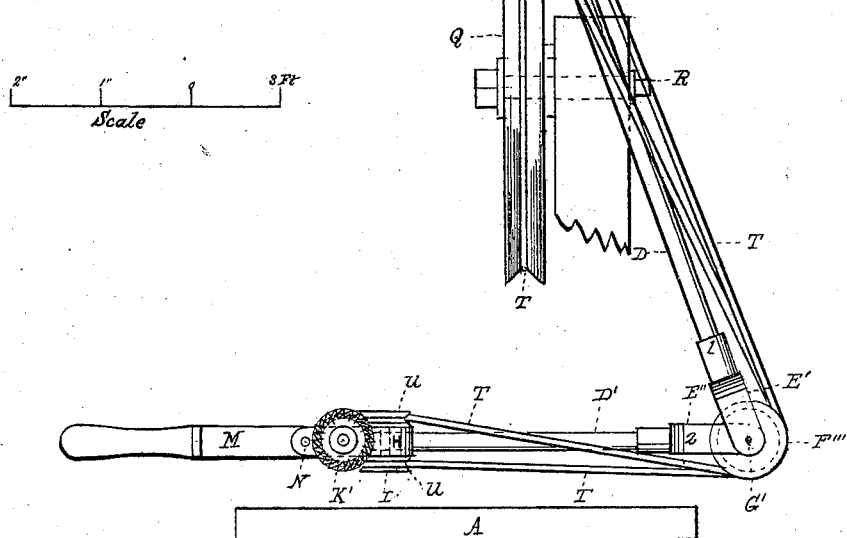
WITNESSES
Stephen Ustick
Frank S. Tayman
INVENTOR.
Benjamin J. Tayman
AM. PHOTO-LITHOGRAPHIC CO. N.Y. (OSBORNE'S PROCESS.)

B. J. TAYMAN.
Improvement in Carving-Machines.
No. 126,994.
2 Sheets--Sheet 2.
Patented May 21, 1872.
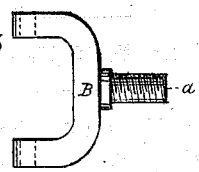
FIG. 3
FIG. 4
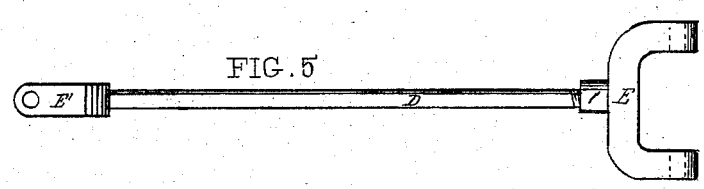
FIG. 5
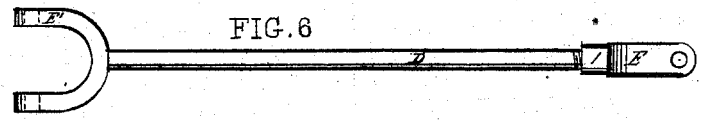
FIG. 6
FIG. 9
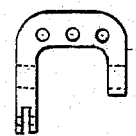
FIG. 10
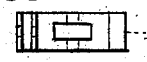
FIG. 11
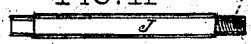
FIG. 7
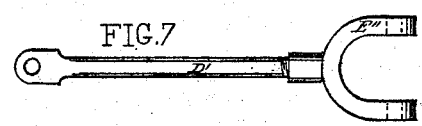
FIG. 8
FIG. 12
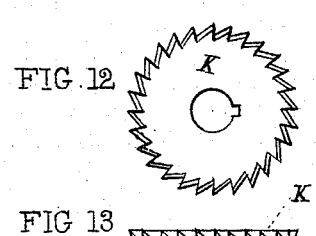
FIG. 13
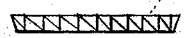
WITNESSES
Stephen Ustick
Frank S. Tayman
INVENTOR.
Benjamin J. Tayman No. 126,994

UNITED STATES PATENT OFFICE.

BENJAMIN J. TAYMAN, OF PHILADELPHIA, PENNSYLVANIA.

IMPROVEMENT IN CARVING-MACHINES.

Specification forming part of Letters Patent No. 126,994, dated May 21, 1872; antedated May 8, 1872.

Specification describing a Universal Traverser for Circular Cutters, &c., invented by BENJAMIN J. TAYMAN, of the city of Philadelphia and State of Pennsylvania.

My invention relates to a series of universal joints provided with pulleys or belt-wheels, an endless band or belt, and a revolving shaft carrying cutters for forming dovetails, rabbets, groove-moldings, &c., and a bit or bits for boring or drilling, in combination with a driving-wheel, the several parts being so constructed and arranged as to admit of the cutters and bits being placed in either a perpendicular or vertical position, or on any required angle to suit the work to be done, as hereinafter described.

For the purpose of making a variety of moldings, &c., I can use circular cutters of a number of toothed plates or saws, so constructed in their dimensions and shape, that when confined together their periphery shall correspond to the shape of the molding, or other surface or surfaces desired. By making the cutters in this manner, as there are innumerable cutting-edges, the labor of each is comparatively trifling to that of cutters formed in the usual manner, in which there can be only a small number of cutters to a cutter-head, and consequently there will be much fewer stoppages required for sharpening the cutters; and, besides, the teeth may readily be sharpened by taking the plates apart, and brought accurately together when the cutters are sharpened, by merely slipping their center eyes on the mandrel.

Figure 1 is a plan view of the machine. Fig. 2 is a side elevation of the same. Figs. 3 and 4, Plate 2, are a side and edge view of the swivel-head B. Figs. 5 and 6 are views at right angles of the connecting-rod D, having swivel-heads E and E'. Figs. 7 and 8 are like views of connecting-rod D', provided at one end with a swivel-head, E''. Fig. 9 is a plan view of the cutter-stock H. Fig. 10 is an edge view of the same. Fig. 11 is a side view of the mandrel J. Figs. 12 and 13 are face and edge views of one of the circular cutters K on an enlarged scale.

Like letters in all the figures indicate the same parts.

A is a table, on which is confined the piece of timber or other article to be worked. B is a swivel-head, shown in detail in Figs. 3 and 4, whose pin $a$ is connected with a piece, C, of a standing frame, or a timber of the building in which the machine is placed, in such a manner as to admit of a free and easy turning of the head. D, seen in detail in Figs. 5 and 6, is a connecting-rod, which has a swivel-head, E, in which it revolves at 1, on one end and a like head, E', on the other, at right angles to the head E. The head E is provided with sheaves F and F', which turn on the joint-pin G that connects the heads B and E. D', shown in detail in Figs. 7 and 8, is a connecting-rod, which is provided at one end with a swivel-head, E'', in which it revolves at 2, that is connected with the head E' of the rod D by means of a joint-pin, G'', which pin is provided with sheaves F'' and F'''. The other end of the rod is connected with the cutter-stock H, which is shown in detail in Figs. 9 and 10, by means of the joint-pin I. The cutter-stock is provided with a mandrel, J, which has a combined circular cutter, K, on one end for cutting bevels or dovetails, and a combined cutter, K', on the other end, such as I use for forming moldings. These combined cutters are so formed of a series of toothed disks or saw-plates, one of which is shown in Figs. 12 and 13, of such configuration across their edges as to give the requisite form to the dovetails, moldings, or other work. The plates are confined on the mandrels by means of nuts, or otherwise. The middle portion of the mandrel J is provided with a band-wheel, L. M is a lever for manipulating the cutter-stock. It is connected therewith by means of the joint-pin N. On one end of the mandrel J there is a screw, O, for connecting a drill, P, or boring-bit. Q is a band-wheel on the shaft R, connected with any suitable supports of a standing frame, or timbers of the building. T is an endless band, which is passed over the wheel Q, and thence over the sheaves F and F' in the swivel-head B, the sheaves F'' and F''' in the swivel-head E, and the band-wheel L on the mandrel J, to make a connection between the driving-wheel Q and the mandrel to operate the cutters. There are pairs of grooved guide-wheels U U and U U on the sides of the cutter-stock H, which come in play, respectively, as it is turned on a swivel with the connecting-rod D'.

It will readily be seen that the device, as shown and described, can be so adjusted as to change the cutter-stock H from the position it assumes in the drawing to a vertical or any other position required, so as to adapt the circular cutters, or the drills, or boring-bits to the work to be executed, the universal joints admitting such a free turning as to bring the stock in any position required.

I claim as my invention—

The combination of the swivel-head B, the connecting-rod D having swiveled-heads E and and E', and revolving in the latter; the joint-pins G and G' carrying sheaves F F' F'' F'''; the connecting-rod D' and the swivel-head E'' in which it turns; the cutter-stock H, connected with the rod D' by means of the joint-pin I; the mandrel J provided with circular cutters, and with or without a boring-bit; the band-wheel Q, and band T, all constructed and arranged for joint operation, substantially in the manner and for the purpose set forth.

BENJAMIN J. TAYMAN.

Witness:
 FRANK S. TAYMAN,
 STEPHEN USTICK.